United States Patent
Atagi et al.

(10) Patent No.: US 11,468,910 B2
(45) Date of Patent: Oct. 11, 2022

(54) MAGNETIC RECORDING MEDIUM HAVING REINFORCED SUBSTRATE

(71) Applicant: Sony Corporation, Tokyo (JP)

(72) Inventors: Hiroto Atagi, Tokyo (JP); Noboru Sekiguchi, Tokyo (JP); Takashi Aizawa, Tokyo (JP); Tomoe Ozaki, Tokyo (JP); Koji Suzuki, Tokyo (JP); Yoichi Kanemaki, Tokyo (JP); Teruo Sai, Tokyo (JP); Ryoichi Hiratsuka, Tokyo (JP); Kazuya Hashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/275,578

(22) PCT Filed: Aug. 29, 2019

(86) PCT No.: PCT/JP2019/033972
§ 371 (c)(1),
(2) Date: Mar. 11, 2021

(87) PCT Pub. No.: WO2020/054452
PCT Pub. Date: Mar. 19, 2020

(65) Prior Publication Data
US 2022/0108723 A1 Apr. 7, 2022

(30) Foreign Application Priority Data
Sep. 14, 2018 (JP) .............................. JP2018-172755

(51) Int. Cl.
*G11B 5/706* (2006.01)
*G11B 5/73* (2006.01)
(Continued)

(52) U.S. Cl.
CPC .......... *G11B 5/70678* (2013.01); *G11B 5/706* (2013.01); *G11B 5/714* (2013.01);
(Continued)

(58) Field of Classification Search
None
See application file for complete search history.

(56) References Cited

U.S. PATENT DOCUMENTS 5,728,454 A * 3/1998 Inaba ..................... G11B 5/716
427/128
6,033,760 A * 3/2000 Wakana ................. G11B 5/733
(Continued)

FOREIGN PATENT DOCUMENTS

JP 2003-030818 A 1/2003
JP 2003030818 A * 1/2003
(Continued)

OTHER PUBLICATIONS

Machine Translation of JP 2003-132525 A (Year: 2003).*
(Continued)

*Primary Examiner* — Kevin M Bernatz
(74) *Attorney, Agent, or Firm* — K&L Gates LLP (57) ABSTRACT

A tape-like magnetic recording medium includes a reinforced substrate, and a recording layer arranged on the reinforced substrate, and the reinforced substrate includes a substrate that has a first face and a second face opposed to each other, and has an average thickness of 4 μm or smaller, and a metal layer that contains cobalt, arranged on the first face, the reinforced substrate by itself causing thereon a depth of indentation of 0.25 μm or shallower, when a 0.7-mm-diameter hard sphere is impressed against the second face under 5.0 gf load for 10 seconds.

9 Claims, 3 Drawing Sheets

(51) Int. Cl.
*G11B 5/714* (2006.01)
*G11B 5/78* (2006.01)

(52) U.S. Cl.
CPC ...... *G11B 5/73913* (2019.05); *G11B 5/73925* (2019.05); *G11B 5/73931* (2019.05); *G11B 5/73935* (2019.05); *G11B 5/78* (2013.01)

(56) References Cited

U.S. PATENT DOCUMENTS

| | | | |
|---|---|---|---|
| 6,391,419 B1* | 5/2002 | Katayama | G11B 5/73923 |
| | | | 428/473.5 |
| 6,472,063 B1* | 10/2002 | Watase | G11B 5/7023 |
| 10,872,633 B2* | 12/2020 | Nakashio | G11B 5/7368 |
| 2018/0122417 A1* | 5/2018 | Watanabe | G11B 5/65 |

FOREIGN PATENT DOCUMENTS

| | | | |
|---|---|---|---|
| JP | 2003-132525 A | | 5/2003 |
| JP | 2003132525 A | * | 5/2003 |
| JP | 2005-276361 A | | 10/2005 |
| JP | 2006-221782 A | | 8/2006 |
| JP | 2006-338795 A | | 12/2006 |
| JP | 2009-064511 A | | 3/2009 |
| JP | 2009064511 A | * | 3/2009 |
| JP | 2012-128905 A | | 7/2012 |
| JP | 2017-041293 A | | 2/2017 |
| WO | 2008/149812 A1 | | 12/2008 |
| WO | 2017/122247 A1 | | 7/2017 |

OTHER PUBLICATIONS

Machine Translation of JP 2009-064511 A (Year: 2009).*
International Search Report dated Nov. 5, 2019 in connection with PCT/JP2019/033972.

* cited by examiner

MAGNETIC RECORDING MEDIUM HAVING REINFORCED SUBSTRATE

TECHNICAL FIELD

The present disclosure relates to a magnetic recording medium.

BACKGROUND ART

Tape-like magnetic recording medium would cause off-track due to environmentally induced dimensional changes. There has therefore been proposed provision of a reinforced layer (metal layer) to a substrate, in order to suppress the environmentally induced dimensional changes (see, for example, Patent Documents 1, 2).

CITATION LIST

Patent Document

Patent Document 1: Japanese Patent Application Laid-Open No. 2005-317159
Patent Document 2: Japanese Patent Application Laid-Open No. 2008-84509

SUMMARY OF THE INVENTION

Problems to Be Solved By the Invention

In order to respond to recent needs for larger capacity of the tape-like magnetic recording medium, it has been devised to thin the substrate and to reduce the total thickness of the magnetic recording medium, so as to increase recording capacity allowed for a single data cartridge. Provision of the reinforced layer to the thus thinned substrate would, however, increase defects on a recording surface of the magnetic recording medium.

It is therefore an object of the present disclosure to provide a magnetic recording medium, not only capable of suppressing environmentally induced dimensional changes, but also capable of suppressing defects from occurring on the recording surface.

Solutions to Problems

In order to solve the issues described above, the present disclosure provides a tape-like magnetic recording medium including a reinforced substrate, and a recording layer arranged on the reinforced substrate, the reinforced substrate including a substrate that has a first face and a second face opposed to each other, and has an average thickness of 4 μm or smaller, and a metal layer that contains cobalt, arranged on the first face, the reinforced substrate by itself causing thereon a depth of indentation of 0.25 μm or shallower, when a 0.7-mm-diameter hard sphere is impressed against the second face under 5.0 gf load for 10 seconds.

Effects of the Invention

According to the present disclosure, it now becomes possible to suppress environmentally induced dimensional changes, and also to suppress defects on the recording surface from occurring. It should be noted that the effect described here is not necessarily limitative and may be any effect described in the present disclosure or an effect different therefrom.

MODE FOR CARRYING OUT THE INVENTION

Embodiments of the present technology will be described in the following order.
1 Overview
2 Configuration of Magnetic Recording Medium
3 Method of Producing Magnetic Recording Medium
4 Effects
5 Modified Examples

1 Overview

Figure 1:
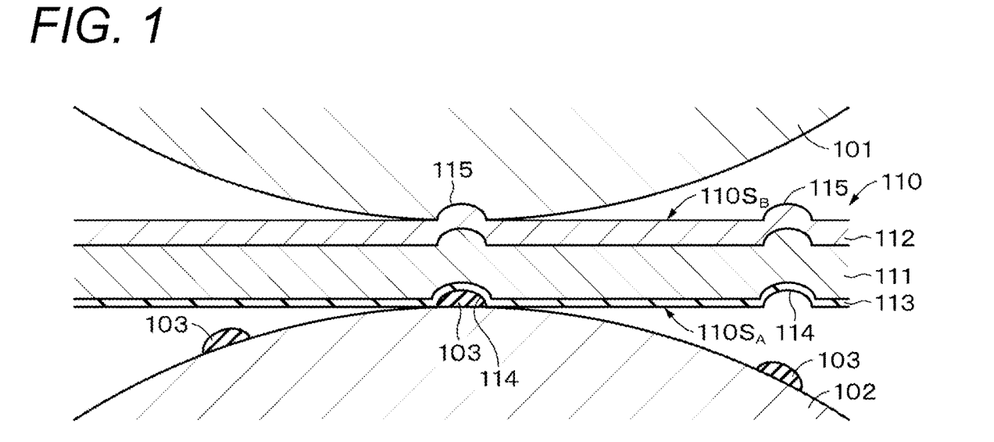
FIG. 1 is a cross-sectional view for explaining a reason why defects on a recording surface have occurred.

The present inventors found after our thorough examinations that why defects can increase on the recording surface, when the reinforced layer is provided on a thinned substrate, is attributed to the point below. That is, in a manufacturing process of a magnetic recording medium, there are as illustrated in FIG. 1 a plurality of pairs of rollers 101, 102 that nip a magnetic recording medium 110 which is caused to travel. In the magnetic recording medium 110 with a thin substrate 111, a foreign matter 103 may be caught between a recording surface $110S_A$ of a recording layer 113 and the roller 102 to produce a dent (indentation) 114 on the recording surface $110S_A$, and the dent 114 thus formed tends to create a bump 115 on a back face $110S_B$ on the opposite side of the recording surface $110S_A$, conforming to the dent 114. Now a reinforced layer 112, when provided on the substrate 111, can cause plastic deformation due to the bump 115 on the back face $110S_B$, allowing the recording surface $110S_A$ to retain the dent 114, which remains as a defect. In particular, in a case where the substrate 111 has an average thickness of 4 μm or thinner, the back face $110S_B$ will be more likely to produce the bump 115 conforming to the dent 114 on the recording surface $110S_A$, and this promotes occurrence of defects.

In consideration of the cause for increased defects on the recording surface described above, the present inventors conducted thorough examinations, and finally found that the defects on the recording surface could be suppressed, by providing the magnetic recording medium with a reinforced substrate that includes a substrate having a first face and a second face opposed to each other, and having an average thickness of 4 μm or smaller; and a metal layer that contains cobalt, arranged on the first face; in which the reinforced substrate by itself causes thereon a depth of indentation of 0.25 μm or shallower, when a 0.7-mm-diameter hard sphere is impressed against the second face under 5.0 gf load for 10 seconds.

2 Configuration of Magnetic Recording Medium

Figure 2:
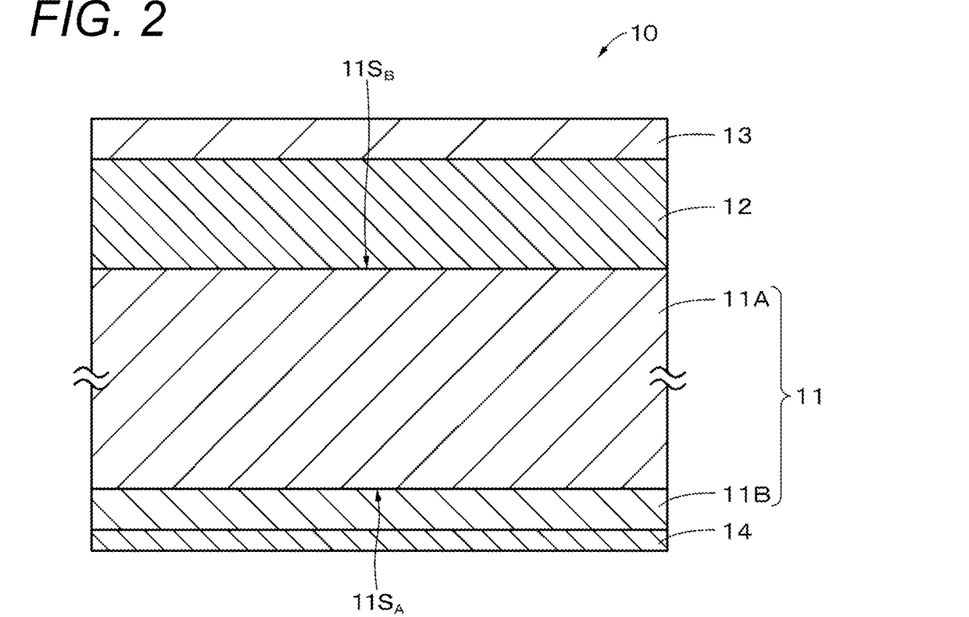
FIG. 2 is a cross-sectional view of a magnetic recording medium according to a first embodiment of the present disclosure.

A configuration of a magnetic recording medium 10 according to an embodiment will be described with reference to FIG. 2. The magnetic recording medium 10 includes an elongated reinforced substrate 11, an underlayer 12 provided on one surface of the reinforced substrate 11, a recording layer 13 provided on the underlayer 12, and a back layer 14 provided on the other surface of the reinforced substrate 11. Note that the underlayer 12 and the back layer 14 are provided as necessary, and do not necessarily need to be provided.

The magnetic recording medium 10 has a long tape shape, and is caused to travel in the longitudinal direction at the time of recording/playback. Note that the surface of the recording layer 13 is a surface on which a magnetic head is caused to travel. The magnetic recording medium 10 is adapted to recording at a minimum recording wavelength of preferably 50 nm or shorter, and of more preferably 46 nm or shorter, and is used on a record/playback device having a minimum recording wavelength of 50 nm or shorter, and of preferably 46 nm or shorter. The lower limit value of the minimum recording wavelength is not particularly limited, however, it may be 16 nm or more, for example.

The magnetic recording medium 10 is preferably used on a record/playback device equipped with a ring head as a recording head. The magnetic recording medium 10 may be used for library device. The library device in this case may have a plurality of the aforementioned record/playback devices.

Note that in the specification, "vertical direction" means a direction (thickness direction of the magnetic recording medium 10) perpendicular to the surface of the magnetic recording medium 10 in a flat state. The "longitudinal direction" means the longitudinal direction (traveling direction) of the magnetic recording medium 10.

(Reinforced Substrate)

The reinforced substrate 11 includes a substrate 11A having a first face $11S_A$ and a second face $11S_B$ opposed to each other, and a reinforced layer 11B arranged on the first face $11S_A$. The back layer 14 is arranged on the side of the first face $11S_A$ where the reinforced layer 11B is arranged, and the underlayer 12 and the recording layer 13 are arranged on the side of the second face $11S_B$ opposite to the side where the reinforced layer 11B is provided. Note that, in the description below, the face on which the reinforced layer 11B is arranged, out of both faces of the reinforced substrate 11, may occasionally be referred to as "reinforced face".

(Substrate)

The substrate 11A is a non-magnetic support that supports the underlayer 12 and the recording layer 13. The substrate 11A has a long film shape. The upper limit value of the average thickness of the substrate 11A is favorably not more than 4 μm, more favorably not more than 3.8 μm, and still more favorably not more than 3.4 μm. In the case where the upper limit value of the average thickness of the substrate 11A is not more than 4 μm, the recording capacity of single data cartridge can be increased as compared with that of a general magnetic recording medium. The lower limit value of the average thickness of the substrate 11A is favorably not less than 3 μm. In the case where the lower limit value of the average thickness of the substrate 11A is not less than 3 μm, the reduction in strength of the substrate 11A can be suppressed.

The average thickness of the substrate 11A is obtained as follows. First, the magnetic recording medium 10 having a width of ½ inch is prepared and cut into a 250 mm length to prepare a sample. Subsequently, layers (i.e., the underlayer 12, the recording layer 13, and the back layer 14) of the sample other than the substrate 11A are removed with a solvent such as MEK (methyl ethyl ketone) and dilute hydrochloric acid. Next, the thickness of the sample (substrate 11A) is measured at five or more points by using a laser hologauge (LGH-110C) manufactured by Mitutoyo Corporation as a measurement apparatus, and the measured values are simply averaged (arithmetic average) to calculate the average thickness of the substrate 11A. Note that the measurement positions are randomly selected from the sample.

The substrate 11A contains, for example, at least one of polyesters, polyolefins, cellulose derivatives, vinyl resins, or other polymer resins. In the case where the substrate 11A contains two or more of the above-mentioned materials, the two or more materials may be mixed, copolymerized, or stacked.

The polyesters include, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bisphenoxy carboxylate.

The polyolefins include, for example, at least one of polyethylene (PE) and polypropylene (PP). The cellulose derivatives include, for example, at least one of cellulose diacetate, cellulose triacetate, cellulose acetate butyrate (CAB), and cellulose acetate propionate (CAP). The vinyl resins include, for example, at least one of polyvinyl chloride (PVC) and polyvinylidene chloride (PVDC).

The other polymer resins include, for example, at least one of polyamide (PA, nylon), aromatic polyamide (aromatic PA, aramid), polyimide (PI), aromatic polyimide (aromatic PI), polyamide imide (PAD, aromatic polyamide imide (aromatic PAI), polybenzoxazole (PBO, e.g., Zylon (registered trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU).

(Reinforced Layer)

The reinforced layer 11B is intended for reinforcing the substrate 11A. With the reinforced layer 11B provided to the substrate 11A, the environmentally induced dimensional changes may be suppressed. The reinforced layer 11B is a metal layer that contains cobalt. With use of the metal layer that contains cobalt as the reinforced layer 11B, the reinforced layer 11B may be suppressed from causing plastic deformation, and the recording surface may be suppressed from causing defects. The reinforced layer 11B is preferably a sputtered layer formed by sputtering. The reinforced layer 11B, when formed by sputtering, will have a density higher than that obtainable in the case where the reinforced layer 11B is formed by evaporation. Hence, the reinforced layer 11B, being a sputtered layer, can suppress the reinforced layer 11B from causing plastic deformation, and can suppress defects on the recording surface from occurring.

The reinforced layer 11B preferably has an average thickness of 200 nm or larger and 400 nm or smaller, which is more preferably 200 nm or larger and 370 nm or smaller, and even more preferably 200 nm or larger and 350 nm or smaller. The reinforced layer 11B, with an average thickness of 200 nm or larger, can further suppress itself from causing plastic deformation, and can further suppress defects on the recording surface from occurring. On the other hand, the reinforced layer 11B, with an average thickness of 350 nm or smaller, can suppress the magnetic recording medium 10 from being thickened, and can suppress recording capacity allowed for a single data cartridge from decreasing.

The average thickness of the reinforced layer 11B is obtained as follows. First, the magnetic recording medium 10 is thinly processed perpendicular to one surface thereof to prepare a test piece, and the cross section of the test piece is observed by using a transmission electron microscope (TEM).

The test specimen is manufactured by the FIB method. In a case where the FIB method is employed, a carbon layer and a tungsten layer are formed as protective films, which is carried out as a pretreatment for the aforementioned observation of TEM image of cross section. The carbon layer is formed by evaporation, on the surface of the magnetic recording medium 10 on the side where the recording layer 13 is formed, and on the surface on the side where the back layer 14 is formed. Meanwhile, the tungsten layer is formed by evaporation or sputtering, further on the surface on the side where the recording layer 13 is formed. The test specimen is manufactured in the length direction (longitudinal direction) of the magnetic recording medium 10. That is, manufacture of the test specimen creates cross sections in parallel to both of the longitudinal direction and the thickness direction of the magnetic recording medium 10.

An instruments and observation conditions employed for the cross sectional observation are summarized below. Note that magnification and acceleration voltage may properly be controlled depending on types of the instrument.

Instrument: TEM (H9000NAR manufactured by Hitachi. Ltd.)
  Acceleration voltage: 300 kV
  Magnification: 100,000

Next, the obtained TEM image is used for measuring the thickness of the reinforced layer 11B at at least 10 or more positions in the longitudinal direction of the magnetic recording medium 10, and then, the measured values are simply averaged (arithmetic average) to obtain the average thickness of the reinforced layer 11B. Note that the measurement positions are randomly selected from the test piece.

(Recording Layer)

The recording layer 13 is a magnetic layer for recording a signal. The recording layer 13 contains, for example, a magnetic powder and a binder. The recording layer 13 may further contain, as necessary, at least one additive of a lubricant, an antistatic agent, an abrasive, a curing agent, a rust inhibitor, a non-magnetic reinforced particle, and the like.

The upper limit value of the average thickness of the recording layer 13 is favorably not more than 90 nm, more favorably not more than 70 nm, and still more favorably not more than 50 nm. In the case where the upper limit value of the average thickness of the recording layer 13 is not more than 90 nm, it is possible to improve the electromagnetic conversion characteristics (e.g., Signal-to-Noise Ratio (SNR)) because the magnetization can be uniformly recorded in the thickness direction of the recording layer 13 in the case of using a ring-type head as a recording head.

The lower limit value of the average thickness of the recording layer 13 is favorably not less than 30 nm and more favorably not less than 35 nm. In the case where the upper limit value of the average thickness of the recording layer 13 is not less than 30 nm, it is possible to improve the electromagnetic conversion characteristics (e.g., SNR) because output can be secured in the case of using an MR-type head as a playback head. Note that the average thickness of the recording layer 13 may be determined in the same way as the average thickness of the reinforced layer 11B. Note, however, that the magnification of TEM image may properly be controlled depending on the thickness of the recording layer 13.

(Magnetic Powder)

The magnetic powder includes a powder of nanoparticles (hereinafter, referred to as "ε-iron oxide particle") containing ε-iron oxide. The ε-iron oxide particle is a hard magnetic particle from which a high coercive force can be achieved even in the case where it is a fine particle. It is favorable that the ε-iron oxide contained in the ε-iron oxide particle is crystal oriented preferentially in the vertical direction.

The ε-iron oxide particle has a spherical or substantially spherical shape, or has a cubic or substantially cubic shape. Since the ε-iron oxide particle has the shape as described above, in the case of using the ε-iron oxide particle as a magnetic particle, the contact area between the particles in the thickness direction of the magnetic recording medium 10 can be reduced and aggregation of the particles can be suppressed as compared with the case of using a hexagonal plate-like barium ferrite particle as a magnetic particle. Therefore, it is possible to enhance the dispersibility of the magnetic powder, and achieve more excellent electromagnetic conversion characteristics (e.g., SNR).

Figure 3:
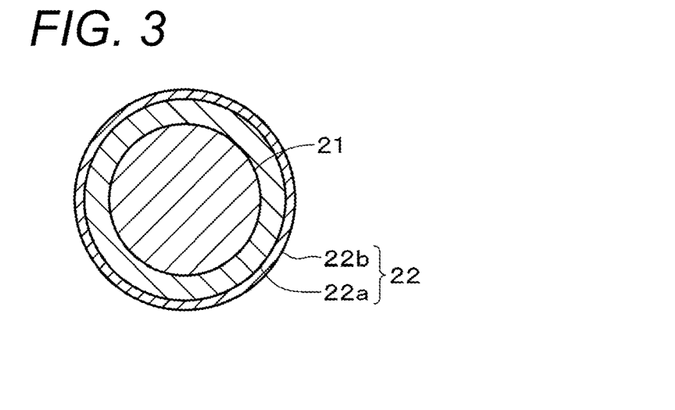
FIG. 3 is a cross-sectional view of a magnetic particle.

The ε-iron oxide particle has a core-shell structure. Specifically, as shown in FIG. 3, the ε-iron oxide particle includes a core part 21, and a shell part 22 that is provided around the core part 21 and has a 2-layer structure. The shell part 22 having the 2-layer structure includes a first shell part 22a provided on the core part 21, and a second shell part 22b provided on the first shell part 22a.

The core part 21 contains ε-iron oxide. The ε-iron oxide contained in the core part 21 favorably has an $\varepsilon$-$Fe_2O_3$ crystal as a main phase, and is more favorably including a single phase of $\varepsilon$-$Fe_2O_3$.

The first shell part 22a covers at least a part of the circumference of the core part 21. More specifically, the first shell part 22a may partially cover the circumference of the core part 21, or may entirely cover the circumference of the core part 21. From the viewpoint of intensifying exchange coupling between the core part 21 and the first shell part 22a, and of improving magnetic characteristics, the entire surface of the core part 21 is preferably covered.

The first shell part 22a is a so-called soft magnetic layer, and contains, for example, a soft magnetic material such as α-Fe, an Ni—Fe alloy, and an Fe—Si—Al alloy. α-Fe may be one obtained by reducing ε-iron oxide contained in the core part 21.

The second shell part 22b is an oxide coating film as an oxidation prevention layer. The second shell part 22b contains α-iron oxide, aluminum oxide, or silicon oxide. The α-iron oxide contains, for example, at least one iron oxide of $Fe_3O_4$, $Fe_2O_3$, or FeO. In the case where the first shell part 22a contains α-Fe (soft magnetic material), the α-iron oxide may be one obtained by oxidizing α-Fe contained in the first shell part 22a.

Since the ε-iron oxide particle includes the first shell part 22a as described above, a coercive force Hc of the entire ε-iron oxide particle (core-shell particle) can be adjusted to the coercive force Hc suitable for recording while maintaining the coercive force Hc of the core part 21 alone to a large value to secure thermal stability. Further, since the ε-iron oxide particle includes the second shell part 22b as described above, it is possible to prevent the characteristics of the ε-iron oxide particle from being reduced due to occurrence of rust or the like on the particle surface by exposure of the ε-iron oxide particle to the air during and before the process of producing the magnetic recording medium 10. Therefore, it is possible to suppress characteristic deterioration of the magnetic recording medium 10.

The magnetic powder preferably has an average particle size of 25 nm or smaller, which is more preferably 23 nm or smaller. In the magnetic recording medium 10, an actual magnetization area measures a half of recording wavelength. Hence, particularly excellent electromagnetic conversion characteristics (SNR, for example) is obtainable, by controlling the average particle size of the magnetic powder not larger than a half of the minimum recording wavelength. With the average particle size of the magnetic powder adjusted to 25 nm or smaller, particularly good electromagnetic conversion characteristics (SNR, for example) is obtainable in the magnetic recording medium 10 which is configured to record signals at a minimum recording wavelength of 50 nm or shorter. The lower limit value of the average particle size of the magnetic powder is, for example, 8 nm or above, although not specifically limited.

The average aspect ratio of the magnetic powder is favorably not less than 1.0 and not more than 3.0, more favorably not less than 1.0 and not more than 2.5, still more favorably not less than 1.0 and not more than 2.1, and particularly favorably not less than 1.0 and not more than 1.8. In the case where the average aspect ratio of the magnetic powder is within the range of not less than 1.0 and not more than 3.0, aggregation of the magnetic powder can be suppressed and the resistance applied to the magnetic powder when the magnetic powder is vertically oriented in the process of forming the recording layer 13 can be suppressed. Therefore, it is possible to increase the degree of vertical orientation of the magnetic powder. Therefore, it is possible to improve the electromagnetic conversion characteristics (e.g., SNR).

The average particle size and the average aspect ratio of the magnetic powder described above are determined as follows. First, the magnetic recording medium 10 to be measured is processed typically by the focused ion beam (FIB) method or the like to obtain a thin strip, and a cross section of the thin strip is observed under a TEM. More specifically, the cross section is observed by using H-9500 from Hitachi High-Technologies Corporation, at an acceleration voltage of 200 kV and at a total magnification of 500,000×, so as to entirely cover the recording layer 13 in the thickness direction of the recording layer 13, to thereby capture a TEM photograph. In a case where the FIB method is employed, a carbon layer and a tungsten layer are formed as protective films, which is carried out as a pretreatment for the aforementioned observation of TEM image of cross section. The carbon layer is formed by evaporation, on the surface of the magnetic recording medium 10 on the side where the recording layer 13 is formed, and on the surface on the side where the back layer 14 is formed. Meanwhile, the tungsten layer is formed by evaporation or sputtering, further on the surface on the side where the recording layer 13 is formed. The thin strip is shaped in the length direction (longitudinal direction) of the magnetic recording medium 10. That is, shaping of the thin strip creates cross sections in parallel to both of the longitudinal direction and the thickness direction of the magnetic recording medium 10.

Next, fifty ε-iron oxide particles, having clearly confirmable shapes, are randomly chosen on the thus captured TEM photograph, and major axis length DL and minor axis length DS are measured for each ε-iron oxide particle. Here, the major axis length DL means the largest one (so-called maximum Feret diameter) of distances between two parallel lines drawn from all angles so as to contact the outline of the ε-iron oxide particle. Meanwhile, the minor axis length DS means the largest one of lengths of the ε-iron oxide particle in the direction perpendicular to the major axis of the ε-iron oxide particle.

Subsequently, the major axis lengths DL of the 50 measured ε-iron oxide particles are simply averaged (arithmetic average) to obtain an average major axis length DLave. The average major axis length DLave thus obtained is taken as the average particle size of the magnetic powder. Further, the minor axis lengths DS of the 50 measured ε-iron oxide particles are simply averaged (arithmetic average) to obtain an average minor axis length DSave. Then, on the basis of the average major axis length DLave and the average minor axis length DSave, the average aspect ratio (DLave/DSave) of the ε-iron oxide particle is obtained.

(Binder)

Examples of the binder include a thermoplastic resin, a thermosetting resin, a reactive resin, and the like. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylate ester-acrylonitrile copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenol resin, an epoxy resin, a polyurethane curable resin, a urea resin, a melamine resin, an alkyd resin, a silicone resin, a polyamine resin, a urea formaldehyde resin, and the like.

Further, in order to improve the dispersibility of the magnetic powder, polar functional groups such as —$SO_3M$, —$OSO_3M$, —COOM, P=O(OM)$_2$ (where M in the formula represents a hydrogen atom or an alkali metal such as lithium, potassium, and sodium), a side-chain amine having a terminal group represented by —NR1R2 or —NR1R2R3$^+$X$^-$, a main-chain amine represented by >NR1R2$^+$X$^-$ (where R1, R2, and R3 in the formula each represent a hydrogen atom or a hydrocarbon group, and X$^-$ represents a halogen element ion such as fluorine, chlorine, bromine, and iodine, or an inorganic or organic ion), —OH, —SH, —CN, and an epoxy group may be introduced into all the above-mentioned binders. The amount of polar functional groups introduced into the binder is favorably $10^{-1}$ to $10^{-8}$ mol/g and more favorably $10^{-2}$ to $10^{-6}$ mol/g.

(Lubricant)

Examples of the lubricant include an ester of a monobasic fatty acid having 10 to 24 carbon atoms and any of monohydric to hexahydric alcohols having 2 to 12 carbon atoms, a mixed ester thereof, a di-fatty acid ester, a tri-fatty acid ester, and the like. Specific example of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like.

(Antistatic Agent)

Examples of the antistatic agent include carbon black, a natural surfactant, a nonionic surfactant, a cationic surfactant, and the like.

(Abrasive)

Examples of the abrasive include α-alumina with an alpha conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-like α-iron oxide obtained by dehydrating and annealing magnetic iron oxide starting material, and those obtained by performing surface treatment with aluminum and/or silica as necessary.

(Curing Agent)

Examples of the curing agent include polyisocyanate and the like. Examples of polyisocyanate include an aromatic polyisocyanate such as an adduct of tolylene diisocyanate (TDI) with and an active hydrogen compound, and an aliphatic polyisocyanate such as an adduct of hexamethylene diisocyanate (HMDI) with an active hydrogen compound. The weight average molecular weight of the polyisocyanates is favorably within the range of 100 to 3000.

(Rust Inhibitor)

Examples of the rust inhibitor include phenols, naphthols, quinones, heterocyclic compounds containing a nitrogen atom, heterocyclic compounds containing an oxygen atom, heterocyclic compounds containing a sulfur atom, and the like.

(Non-Magnetic Reinforced Particle)

Examples of the non-magnetic reinforced particle include aluminum oxide (α, β, or γ alumina), chromium oxide, silicon oxide, diamond, garnet, emery, boron nitride, titanium carbide, silicon carbide, titanium carbide, titanium oxide (rutile or anatase titanium oxide), and the like.

(Underlayer)

The underlayer 12 is used to moderate surface irregularity of the substrate 11A, and to control the surface irregularity of the recording layer 13. The underlayer 12 may contain a lubricant, so as to allow it to supply the lubricant to the surface of the recording layer 13. The underlayer 12 is a non-magnetic layer containing a non-magnetic powder and a binder. The underlayer 12 may further contain, as necessary, at least one additive of a lubricant, an antistatic agent, a curing agent, a rust inhibitor, or the like.

The average thickness of the underlayer 12 is favorably not less than 0.6 μm and not more than 2.0 μm and more favorably not less than 0.8 μm and not more than 1.4 μm. Note that the average thickness of the underlayer 12 is obtained similarly to the average thickness of the reinforced layer 11B. Note that the magnification of the TEM image is appropriately adjusted in accordance with the thickness of the underlayer 12.

(Non-Magnetic Powder)

The non-magnetic powder contains, for example, at least one of an inorganic particle powder or an organic particle powder. Further, the non-magnetic powder may contain a carbon powder such as carbon black. Note that one non-magnetic powder may be used alone, or two or more non-magnetic powders may be used in combination. The inorganic particle contains, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder)

The binder is similar to that of the above-mentioned recording layer 13.

(Additive)

The lubricant, the antistatic agent, the curing agent, and the rust inhibitor are similar to those of the above-mentioned recording layer 13.

(Back Layer)

The back layer 14 contains a binder and a non-magnetic powder. The back layer 14 may further contain, as necessary, at least one additive of a lubricant, a curing agent, an antistatic agent, and the like. The lubricant and the antistatic agent are similar to those of the above-mentioned recording layer 13. Further, the non-magnetic powder is similar to that of the above-mentioned underlayer 12.

The average particle size of the non-magnetic powder is favorably not less than 10 nm and not more than 150 nm and more favorably not less than 15 nm and not more than 110 nm. The average particle size of the non-magnetic powder is obtained similarly to the average particle size of the above-mentioned magnetic powder. The non-magnetic powder may contain a non-magnetic powder having two or more types of particle size distribution.

The upper limit value of the average thickness of the back layer 14 is favorably not more than 0.6 μm. In the case where the upper limit value of the average thickness of the back layer 14 is not more than 0.6 μm, the thicknesses of the underlayer 12 and the substrate 11A can be kept thick even in the case where the average thickness of the magnetic recording medium 10 is not more than 5.15 μm. Therefore, the traveling stability of the magnetic recording medium 10 in the record/playback device can be maintained. The lower limit value of the average thickness of the back layer 14 is not particularly limited, but is, for example, not less than 0.2 μm.

The average thickness of the back layer 14 is obtained as follows. First, the magnetic recording medium 10 having a width of ½ inch is prepared and cut into a 250 mm length to prepare a sample. Next, the thickness of the sample is measured at five or more points by using a laser hologauge (LGH-110C) manufactured by Mitutoyo Corporation as a measurement apparatus, and the measured values are simply averaged (arithmetic average) to calculate an average thickness T [μm] of the magnetic recording medium 10. Note that the measurement positions are randomly selected from the sample. Subsequently, the back layer 14 of the sample is removed with a solvent such as methyl ethyl ketone (MEK) and dilute hydrochloric acid. After that, the above-mentioned laser hologauge is used again for measuring the thickness of the sample at five or more points, and the measured values are simply averaged (arithmetic average) to calculate an average thickness $T_1$ [μm] of the magnetic recording medium 10 from which the back layer 14 has been removed. Note that the measurement positions are randomly selected from the sample. After that, an average thickness t [μm] of the back layer 14 is obtained using the following formula.

$$T\,[\mu m] = T[\mu m] - T_1\,[\mu m]$$

(Depth of Indentation)

The reinforced substrate 11 by itself causes thereon a depth of indentation of 0.25 μm or shallower, when a 0.7-mm-diameter hard sphere is impressed against the second face $11S_B$ under 5.0 gf load for 10 seconds, which is preferably 0.20 μm or shallower, and more preferably 0.15 μm or shallower. With the depth of indentation on the second face $11S_B$ controlled to 0.25 μm or shallower, the recording surface may be suppressed from causing defects typically due to nipping by the rollers or the like, in the process of manufacturing the magnetic recording medium.

Figure 4:
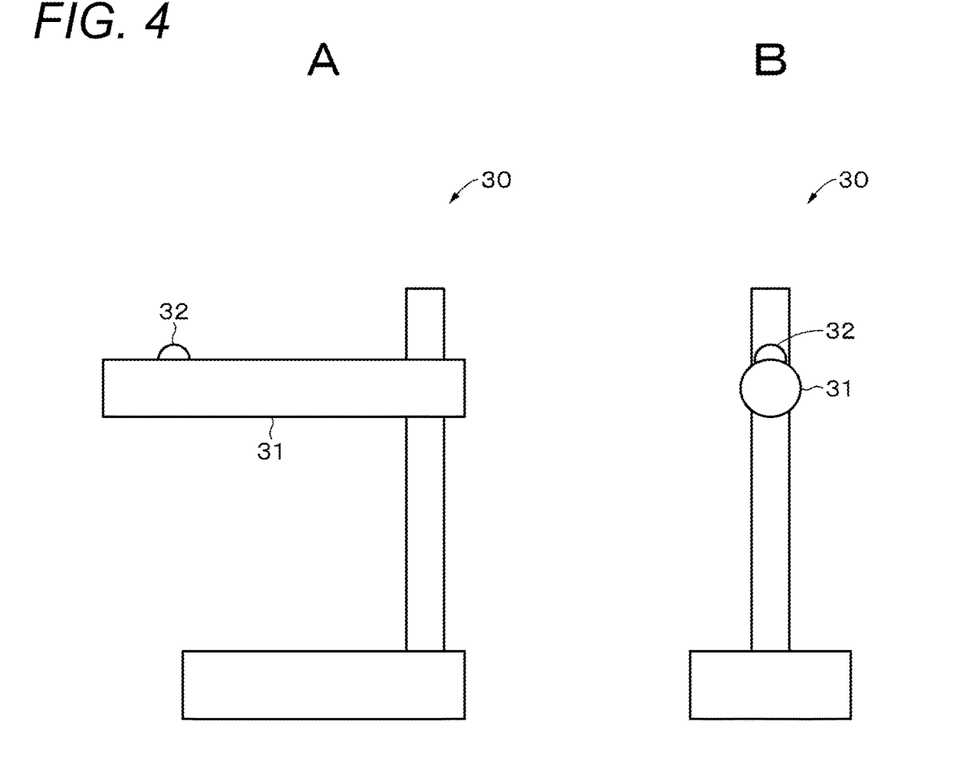
FIG. 4A is a side elevation of a jig used for indentation test.
FIG. 4B is a front elevation of the jig used for the indentation test.
Figure 5:
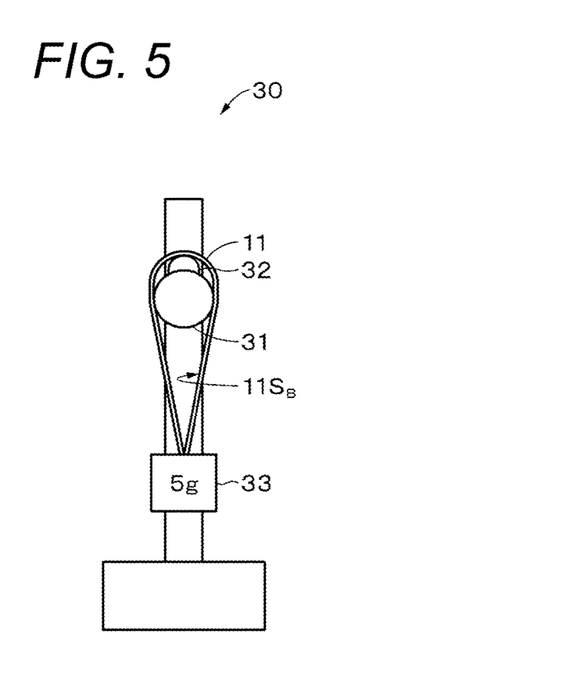
FIG. 5 is a front elevation of the jig, for explaining the indentation test.

The depth of indentation described above may be determined as described below. First, a ½-inch-wide magnetic recording medium 10 is prepared, and then cut into 180 mm length to make a sample. The underlayer 12, the recording layer 13 and the back layer 14 are then removed with a solvent such as methyl ethyl ketone (MEK) or diluted hydrochloric acid. With this arrangement, the reinforced substrate 11 as a measurement sample is thus obtained. Next, as illustrated in FIGS. 4A and 4B, a jig 30 having a Φ0.7 mm (0.7-mm-diameter) hard sphere 32 attached to a stainless steel rod 31 is prepared. Next, as illustrated in FIG. 5, the thus prepared reinforced substrate (measurement sample) 11 is hooked on the stainless steel rod 31 so as to bring the second face (face opposite to the reinforced face) $11S_B$ of the substrate 11A into contact with the hard sphere 32, and a 5 g weight 33 is attached with use of a clip to the end of the thus hung reinforced substrate 11, to apply 5 gf load to the reinforced substrate 11. Then, the reinforced substrate 11 is remained under the load for 10 seconds, and then unhooked. After confirming that an indentation is formed on the reinforced substrate 11, the depth of indentation is then measured by using a non-contact surface/layer cross section profiling system (VertScan, from Ryoka Systems Inc.).

Conditions for measurement with the non-contact surface/layer cross section profiling system are as follows.

Objective lens: 20× (ca. 237 μm×178 μm field of view)
Resolution: 640 points×480 points
Measurement mode: phase
Wavelength filter: 520 nm
Surface correction: corrected with quadratic polynomial approximated surface (Water Vapor Permeability, in 100-nm-Thick Conversion, of Reinforced Layer)

The reinforced layer 11B preferably has a water vapor permeability in 100-nm-thick conversion of 8.36 g/m²·day or smaller, when measured in an environment at a temperature of 28° C. under saturation vapor pressure, which is more preferably 5.86 g/m²·day or smaller, even more preferably 3.36 g/m²·day or smaller, and particularly 1.057 g/m²·day or smaller. With the water vapor permeability, in 100-nm-thick conversion, of the reinforced layer 11B controlled to 8.36 g/m²·day or smaller, the recording surface may be suppressed from causing defects typically due to nipping by the rollers or the like, in the process of manufacturing the magnetic recording medium. The lower limit of the water vapor permeability, in 100-nm-thick conversion, of the reinforced layer 11B is, for example, 0.1 g/m²·day or above, although not specifically limited.

The water vapor permeability, in 100-nm-thick conversion, of the reinforced layer 11B may be measured as follows.

(Measurement of Water Vapor Permeability of Reinforced Substrate)

First, a ½-inch-wide magnetic recording medium 10 is prepared, and then cut into a predetermined length to make a sample. The underlayer 12, the recording layer 13 and the back layer 14 are then removed with a solvent such as methyl ethyl ketone (MEK) or diluted hydrochloric acid. With this arrangement, the reinforced substrate 11 as a measurement sample is thus obtained.

Next, the reinforced substrate 11 is nipped in a dedicated ½-inch tape holder, and water vapor permeability $W_A$ of the reinforced substrate 11 is measured in an environment at a temperature of 28° C. under saturation vapor pressure. Note that a measurement instrument employed here is a water vapor permeability tester (LYSSY L80-5000).

(Measurement of Water Vapor Permeability of Substrate)

First, the reinforced substrate 11 is obtained in the similar way as described in the aforementioned measurement of water vapor permeability of the reinforced substrate 11. Next, the reinforced layer 11B is removed by wiping with use of an acidic solvent. Therefore, the substrate 11A as a measurement sample is thus obtained.

Next, water vapor permeability $W_B$ of the thus prepared substrate 11A is measured similarly to the aforementioned measurement of water vapor permeability of the reinforced substrate 11.

(Calculation of Water Vapor Permeability, in 100-nm-Thick Conversion, of Reinforced Layer)

First, water vapor permeation coefficient P of the reinforced substrate 11 and water vapor permeation coefficient $P_a$ of the substrate 11A are determined.

The water vapor permeation coefficient is given by equation (1) below.

Water vapor permeation coefficient=Water vapor permeability×average film thickness (1)

Next, water vapor permeation coefficient Pb of the reinforced layer 11B is determined by equation (2) below, by using the water vapor permeation coefficient P of the reinforced substrate 11 and the water vapor permeation coefficient $P_a$ of the substrate 11A determined from equation (1).

$$P_b = L \times P \times P_a / (L \times P_a - L_a \times P) \quad (2)$$

Note that L represents the average thickness of the reinforced substrate 11, $L_a$ represents the average thickness of the substrate 11A, and $L_b$ represents the average thickness of the reinforced layer 11B.

Next, water vapor permeability $W_C$ of the reinforced layer 11B of 100 nm thick is determined by equation (3) below, by using the water vapor permeation coefficient $P_b$ determined from equation (2).

$$W_C = P_b/100 \quad (3)$$

Note that the average thicknesses of the individual layers used in the aforementioned equations (1) and (2) may be determined by the aforementioned method for measuring the average thickness.

(Water Vapor Permeability of Reinforced Substrate Converted Assuming Reinforced Layer to be 100 nm Thick)

The reinforced substrate 11 preferably has a water vapor permeability, measured in an environment at a temperature of 28° C. under saturation vapor pressure of 2.46 g/m²·day or smaller, when converted assuming the reinforced layer 11B to be 100 nm thick, which is more preferably 1.60 g/m²·day or smaller, even more preferably 0.81 g/m²·day or smaller, and particularly 0.10 g/m²·day or smaller. The lower limit value of the water vapor permeability of the reinforced substrate 11 converted assuming the reinforced layer 11B to be 100 nm thick is typically 0.10 g/m²·day or above, although not specifically limited. Now the "water vapor permeability of the reinforced substrate 11 converted assuming the reinforced layer 11B to be 100 nm thick" means the water vapor permeability, assuming that the reinforced layer 11B arranged on the first face $11S_A$ of the substrate 11A has a thickness of 100 nm.

(Average Thickness of Magnetic Recording Medium)

The upper limit value of the average thickness (average total thickness) of the magnetic recording medium 10 is favorably not more than 5.15 μm, more favorably not more than 5.0 μm, and still more favorably not more than 4.4 μm. In the case where the average thickness of the magnetic recording medium 10 is not more than 5.15 μm, the recording capacity of one data cartridge can be increased as compared with that of a general magnetic recording medium. The lower limit value the average thickness of the magnetic recording medium 10 is not particularly limited, but is, for example, not less than 3.5 µm.

The average thickness of the magnetic recording medium 10 is obtained by the procedure described in the above-mentioned method of finding the average thickness of the back layer 14.

(Coercive Force Hc)

The magnetic recording medium 10 preferably has the upper limit value of the coercive force Hc in the longitudinal direction of 2000 Oe or smaller, which is more preferably 1900 Oe or smaller, and even more preferably 1800 Oe or smaller. With the coercive force Hc in the longitudinal direction adjusted to 2000 Oe or smaller, good electromagnetic conversion characteristics (SNR, for example) is obtainable even in high-density recording.

The magnetic recording medium 10 preferably has a lower limit value of the coercive force Hc, measured in the longitudinal direction, of 1000 Oe or above. With the coercive force Hc, measured in the longitudinal direction, adjusted to 1000 Oe or larger, demagnetization due to leakage flux from the recording head may be suppressed.

The coercive force Hc described above may be determined as follows. First, measurement samples are cut out from the elongated magnetic recording medium 10, three pieces of which are laminated by using a double-sided tape, punched out with a φ6.39 mm punch, and the punched measurement sample is measured by using a vibrating sample magnetometer (VSM), to determine an M-H loop for the entire measurement sample in the longitudinal direction (travel direction). The magnetic recording medium 10 in this process is marked with some appropriate non-magnetic ink, so that the longitudinal direction (travel direction) may be discriminable. Next, a measurement sample is cut out from the elongated magnetic recording medium 10, the coated films (underlayer 12, recording layer 13, back layer 14 and the like) are wiped off by using acetone, ethanol or the like, to leave the reinforced substrate 11 only, three pieces of which are laminated by using a double-sided tape, and punched out with a φ6.39 mm punch to produce a sample for background correction (simply referred to as "correction sample", hereinafter). Then an M-H loop of the of the correction sample (reinforced substrate 11), in the longitudinal direction (travel direction) of the reinforced substrate 11, is then measured by using a VSM. The M-H loop of the measurement sample (magnetic recording medium 10 as a whole), and the M-H loop of the correction sample (reinforced substrate 11) are measured by using a high sensitivity vibrating sample magnetometer (VSM) "Model VSM-P7-15" from Toei Industry Co., Ltd. Measurement conditions include measurement mode: full-loop, maximum magnetic field: 15 kOe, step of magnetic field: 40 bit, time constant of locking amp: 0.3 sec, waiting time: 1 sec, and average number of MK 20.

Thereafter, the M-H loop of the reinforced substrate 11 is subtracted from the M-H loop of the measurement sample as a whole, to obtain an M-H loop after background correction. The background correction is calculated by using a measurement/analysis program product attached to "Model VSM-P7-15". Coercive force Hc is determined from the thus obtained M-H loop. The measurement/analysis program product attached to "Model VSM-P7-15" is used for the calculation. Note that all of the above-mentioned M-H loops are measured at room temperature (25° C.). Also note that the M-H loops, when measured in the longitudinal direction of the magnetic recording medium 10, is not subject to "demagnetizing field correction".

(Squareness Ratio)

The magnetic recording medium 10 has a squareness ratio $S_1$ in the vertical direction (thickness direction) of 65% or larger, which is preferably 70% or larger, and even more preferably 75% or larger. With the squareness ratio $S_1$ adjusted to 65% or larger, the magnetic powder will be vertically oriented to a sufficient degree, and further excellent electromagnetic conversion characteristics (SNR, for example) are therefore obtainable.

The squareness ratio $S_1$ may be determined as follows. First, an M-H loop after background correction is obtained in the similar way as determination of coercive force Hc, except that the M-H loop is measured in the vertical direction (thickness direction) of the magnetic recording medium 10 and the reinforced substrate 11. Note, however, that the M-H loop, when measured in the vertical direction of the magnetic recording medium 10, is not subject to "demagnetizing field correction". Next, saturation magnetization Ms (emu) and residual magnetization Mr (emu) read from the thus obtained M-H loop are substituted into an equation below, to calculate the squareness ratio $S_1$ (%). Additionally, The measurement/analysis program product attached to "Model VSM-P7-15" is used for the calculation.

$$\text{Squareness ratio } S_1 \text{ (\%)} = (Mr/Ms) \times 100$$

The magnetic recording medium 10 preferably has a squareness ratio $S_2$ in the longitudinal direction (travel direction) of 35% or smaller, which is more preferably 30% or smaller, and even more preferably 25% or smaller. With the squareness ratio $S_2$ adjusted to 35% or smaller, the magnetic powder will be vertically oriented to a sufficient degree, and therefore further excellent electromagnetic conversion characteristics (SNR, for example) are obtainable.

The squareness ratio $S_2$ may be determined in the similar way as for squareness ratio $S_1$, except for that the M-H loop is measured in the longitudinal direction (travel direction) of the magnetic recording medium 10 and the reinforced substrate 11.

3 Method of Producing Magnetic Recording Medium

A method for manufacturing the thus configured magnetic recording medium 10 will be explained. First, the reinforced layer 11B is formed by sputtering, on the first face $11S_A$ of the substrate 11A. Therefore, the reinforced substrate 11 is thus obtained.

Next, a nonmagnetic powder, a binder, and the like are kneaded and dispersed in a solvent to prepare a coating material for forming an underlayer. Next, a magnetic powder, a binder, and the like are kneaded and dispersed in a solvent to prepare a coating material for forming a recording layer. For the preparation of the coating material for forming a recording layer and the coating material for forming an underlayer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for example, kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited to these devices.

Next, the underlayer-forming coating is coated on one face on which the reinforced layer 11B is not formed, out of both faces of the reinforced substrate 11, followed by drying, to form the underlayer 12. Subsequently, the coating material for forming a recording layer is coated on the underlayer 12 and dried to form the recording layer 13 on the underlayer 12. Note that during drying, the magnetic field of the magnetic powder may be oriented in the thickness direction of the substrate 11A by, for Example, a solenoid coil. Further, during drying, after the magnetic field of the magnetic powder may be oriented in the traveling direction (longitudinal direction) of the substrate 11A by, for example, a solenoid coil, the magnetic field of the magnetic powder may be oriented in the thickness direction of the substrate 11A. After forming the recording layer 13, the back layer 14 is formed on the other surface of the reinforced layer 11B out of both faces of the reinforced substrate 11. As a result, the magnetic recording medium 10 is obtained.

After that, the obtained magnetic recording medium 10 is rewound into a large diameter core, and curing treatment is performed thereon. Finally, calendaring treatment is performed on the magnetic recording medium 10, and then, it is cut into a predetermined width (e.g., width of ½ inch). In this way, the target elongated magnetic recording medium 10 is obtained.

4 Effects

The tape-like magnetic recording medium 10 of one embodiment has the reinforced substrate 11, the underlayer 12 arranged on the reinforced substrate 11, and the recording layer 13 arranged on the underlayer 12. The reinforced substrate 11 includes the substrate 11A that has the first face $11S_A$ and the second face $11S_B$ opposed to each other, and has an average thickness of 4 μm or smaller; and the reinforced layer 11B that contains cobalt, arranged on the first face $11S_A$. The reinforced substrate 11 by itself causes thereon a depth of indentation of 0.25 μm or shallower, when a 0.7-mm-diameter hard sphere is impressed against the second face $11S_B$ under 5.0 gf load for 10 seconds. This makes it possible to suppress environmentally induced dimensional changes, and also to suppress defects from occurring on the recording surface.

5 Modified Examples

Modified Example 1

The aforementioned one embodiment has described a case where the reinforced layer 11B is arranged, out of the first and second faces $11S_A$, $11S_B$ of the substrate 11A, on the first face $11S_A$ which is on the side opposite to the side the underlayer 12 and the recording layer 13 are arranged. The reinforced layer 11B may alternatively be arranged, out of the first and second faces $11S_A$, $11S_B$ of the substrate 11A, on the second face $11S_B$ which is on the side the underlayer 12 and the recording layer 13 will be arranged. That is, the reinforced layer 11B may be arranged between the substrate 11A and the underlayer 12.

Modified Example 2

Although the aforementioned one embodiment has described a case where the underlayer 12 and the recording layer 13 are the films formed by the coating process (wet process), they may alternatively be films formed by vacuum film forming technology (dry process). From among films formed by vacuum film forming technology, particularly preferred is a sputtered layer formed by sputtering.

Modified Example 3

Figure 6:
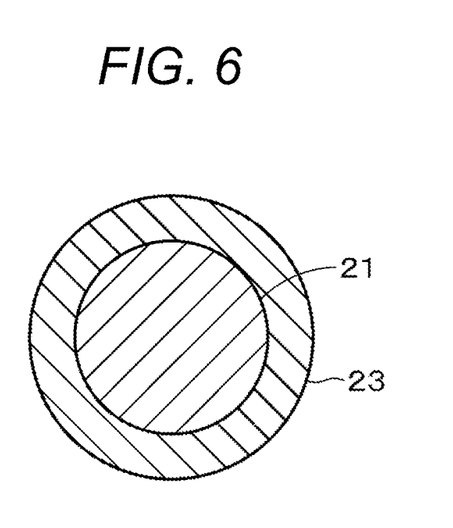
FIG. 6 is a cross-sectional view of a magnetic particle in a modified example.

Although the case where the ε-iron oxide particle includes the shell part 22 having a 2-layer structure has been described in the above-mentioned embodiment, the ε-iron oxide particle may include a shell part 23 having a single-layer structure as shown in FIG. 6. In this case, the shell part 23 has a configuration similar to that of the first shell part 22a. However, from the viewpoint of suppressing the characteristic deterioration of the ε-iron oxide particle, it is favorable that the ε-iron oxide particle includes the shell part 22 having a 2-layer structure as in the above-mentioned embodiment.

Modified Example 4

Although the case where the ε-iron oxide particle has a core-shell structure has been described in the above-mentioned embodiment, the ε-iron oxide particle may contain an additive instead of the core-shell structure, or may contain additive while having a core-shell structure. In this case, a part of Fe of the ε-iron oxide particle is substituted with an additive. Since the coercive force Hc of the entire ε-iron oxide particle can be adjusted to the coercive force Hc suitable for recording also by the ε-iron oxide particle containing an additive, it is possible to improve the ease of recording. The additive is a metal element other than iron, favorably a trivalent metal element, more favorably at least one of Al, Ga, or In, and still more favorably at least one of Al or Ga.

Specifically, ε-iron oxide containing the additive is an $\varepsilon\text{-Fe}_{2-x}M_xO_3$ crystal (where M represents a metal element other than iron, favorably a trivalent metal element, more favorably at least one of Al, Ga, or In, and still more favorably at least one of Al or Ga. x satisfies the relationship of, for example, $0<x<1$).

Modified Example 5

The magnetic powder may include a powder of nanoparticles (hereinafter, referred to as "hexagonal ferrite particles") containing hexagonal ferrite instead of the powder of the ε-iron oxide particles. The hexagonal ferrite particles each have, for example, a hexagonal plate shape or a substantially hexagonal plate shape. The hexagonal ferrite favorably contains at least one of Ba, Sr, Pb, or Ca and more favorably at least one of Ba or Sr. The hexagonal ferrite may be specifically, for example, barium ferrite or strontium ferrite. The barium ferrite may further contain at least one of Sr, Pb, and Ca in addition to Ba. The strontium ferrite may further contain at least one of Ba, Pb, and Ca in addition to Sr.

More specifically, the hexagonal ferrite has an average composition represented by a general formula $MFe_{12}O_{19}$. However, M represents, for example, at least one metal of Ba, Sr, Pb, or Ca and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the above-mentioned general formula, a part of Fe may be substituted with another metal element.

In the case where the magnetic powder includes a powder of the hexagonal ferrite particles, the average particle size of the magnetic powder is favorably not more than 50 nm, more favorably not less than 10 nm and not more than 40 nm, and still more favorably not less than 15 nm and not more than 30 nm. In the case where the magnetic powder includes a powder of the hexagonal ferrite particles, the average aspect ratio of the magnetic powder is similar to that in the above-mentioned embodiment.

Note that the average aspect ratio of the magnetic powder may be determined as follows. First, the magnetic recording medium 10 to be measured is processed typically by the FIB method or the like to obtain a thin strip, and a cross section of the thin strip is observed under a TEM. More specifically, the cross section is observed by using H-9500 from Hitachi High-Technologies Corporation, at an acceleration voltage of 200 kV and at a total magnification of 500,000×, so as to entirely cover the recording layer 13 in the thickness direction of the recording layer 13, to thereby capture a TEM photograph. In a case where the FIB method is employed, a carbon layer and a tungsten layer are formed as protective films, which is carried out as a pretreatment for the after-mentioned observation of TEM image of cross section. The carbon layer is formed by evaporation, on the surface of the magnetic recording medium 10 on the side where the recording layer 13 is formed, and on the surface on the side where the back layer 14 is formed. Meanwhile, the tungsten layer is formed by evaporation or sputtering, further on the surface on the side where the recording layer 13 is formed. The thin strip is shaped in the length direction (longitudinal direction) of the magnetic recording medium 10. That is, shaping of the thin strip creates cross sections in parallel to both of the longitudinal direction and the thickness direction of the magnetic recording medium 10.

Next, fifty particles which direct the side faces towards the surface to be observed, and have clearly confirmable thickness, are randomly chosen on the thus captured TEM photograph, and the maximum thickness DA is measured for each particle. Values of the maximum thickness DA of fifty particles are then simply averaged (to obtain arithmetic mean) to determine averaged maximum thickness DAave.

Next, fifty particles are randomly chosen on the thus captured TEM photograph, and the maximum diameter DB is measured for each particle. Values of the maximum diameter DB of fifty particles are then simply averaged (to obtain arithmetic mean) to determine averaged maximum diameter DBave. Next, average aspect ratio (DBave/DAave) of the magnetic powder is determined from the average maximum thickness DAave and the average maximum diameter DBave.

Modified Example 6

The magnetic powder may include a powder of nanoparticles (hereinafter, referred to as "cobalt ferrite particles") containing Co-containing spinel ferrite instead of the powder of the ε-iron oxide particle. The cobalt ferrite particle favorably has uniaxial anisotropy. The cobalt ferrite particle has, for example, a cubic shape or a substantially cubic shape. The Co-containing spinel ferrite may further contain at least one of Ni, Mn, Al, Cu, and Zn in addition to Co.

The Co-containing spinel ferrite has, for example, an average composition represented by the following formula (a).

$$Co_xM_yFe_2O_z \qquad (a)$$

(where in the formula (a), M represents, for example, at least one metal of Ni, Mn, Al, Cu, and Zn. x represents a value within the range of $0.4 \leq x \leq 1.0$. y represents a value within the range of $0 \leq y \leq 0.3$. Note that x and y satisfy a relation of $(x+y) \leq 1.0$. z represents a value within the range of $3 \leq z \leq 4$. A part of Fe may be substituted by other metal element.)

In a case where the magnetic powder contains the cobalt-ferrite particle powder, the average particle size of the magnetic powder is preferably 25 nm or smaller, and more preferably 23 nm or smaller. Method for calculating the average particle size of the magnetic powder is similar to the method for calculating the average particle size of the magnetic powder in the aforementioned one embodiment. In a case where the magnetic powder contains a cobalt-ferrite particle powder, the average aspect ratio of the magnetic powder is similar to the average aspect ratio of the magnetic powder in the aforementioned one embodiment. Also method for calculating the average aspect ratio of the magnetic powder is similar to the method for calculating the average aspect ratio of the magnetic powder in the aforementioned one embodiment.

EXAMPLES

Hereinafter, the present disclosure will be specifically described by way of Examples. However, the present disclosure is not limited to only these Examples.

In Examples, average thickness of the PEN film (substrate), average thickness of the recording layer, average thickness of the underlayer, average thickness of the reinforced layer (Co film, Cu film), average thickness of the back layer, average thickness of the magnetic tape (magnetic recording medium), depth of indentation of the reinforced film (reinforced substrate), water vapor permeability, in 100 nm thick conversion, of the reinforced layer (Co film, Cu film), and water vapor permeability of the reinforced substrate converted assuming reinforced layer to be 100 nm thick, are determined by the measurement methods having been explained in the aforementioned one embodiment.

Example 1

(Process for Manufacturing Reinforced Film)

The reinforced substrate was manufactured as follows. First, a PEN film with a long form and an average thickness of 3.2 μm was prepared as the substrate. Next, a Co film having an average thickness of 270 nm was formed by sputtering on one face (first face) of the PEN film. In this process, conditions for forming the Co film were adjusted so that the Co film will have a water vapor permeability, in 100-nm-thick conversion, of 1.057 g/m²·day. The reinforced film (reinforced substrate) was thus obtained.

The thus obtained reinforced film was found to demonstrate a depth of indentation of 0.25 μm, when measured by impressing a 0.7-mm-diameter hard sphere against the face opposite to the reinforced surface, under 5.0 gf load for 10 seconds.

(Step of Preparing Coating Material for Forming Recording Layer)

A coating material for forming a recording layer was prepared as follows. First, a first composition having the following formulation was kneaded by an extruder. Next, the kneaded first composition and a second composition having the following formulation were added to a stirring tank including a dispersing device, and, premixed. Subsequently, further sand mill mixing was performed, and filter treatment was performed to prepare a coating material for forming a recording layer.

(First Composition)
ε-iron oxide magnetic powder: 100 parts by mass
Vinyl chloride resin (Cyclohexanone solution 30 mass %): 10 parts by mass
(Degree of polymerization 300, Mn=10000, containing $OSO_3K$=0.07 mmol/g and secondary OH=0.3 mmol/g as polar groups)
Aluminum oxide powder: 5 parts by mass
($α$-$Al_2O_3$, average particle diameter 0.2 μm)
Carbon black: 2 parts by mass
(Manufactured by TOKAI CARBON CO., LTD., trade name: SEAST TA)

(Second Composition)
Vinyl chloride resin: 1.1 parts by mass
(Resin solution: resin content 30 mass %, cyclohexanone 70 mass %)
n-butyl stearate: 2 parts by mass
Methyl ethyl ketone: 121.3 parts by mass
Toluene: 121.3 parts by mass
Cyclohexanone: 60.7 parts by mass
Finally, as curing agents, polyisocyanate (trade name: Coronate L manufactured by Tosoh Corporation): 4 parts by mass and myristic acid: 2 parts by mass are added to the coating material for forming a recording layer prepared as described above.

(Step of Preparing Coating Material for Forming Underlayer)

The coating material for forming an underlayer was prepared as follows. First, a third composition having the following formulation was kneaded by an extruder. Next, the kneaded third composition and a fourth composition having the following formulation were added to a stirring tank including a dispersion device, and premixed. Subsequently, further sand mill mixing was performed, and filter treatment was performed to prepare a coating material for forming an underlayer.

(Third Composition)
Acicular iron oxide powder: 100 parts by mass
($α$-$Fe_2O_3$, average major axis length 0.15 μm)
Vinyl chloride resin: 55.6 parts by mass
(Resin solution: resin content 30 mass %, cyclohexanone 70 mass %)
Carbon black: 10 parts by mass
(Average particle diameter 20 nm)

(Fourth Composition)
Polyurethane resin UR 8200 (manufactured by TOYOBO CO., LTD.): 18.5 parts by mass
n-butyl stearate: 2 parts by mass
Methyl ethyl ketone: 108.2 parts by mass
Toluene: 108.2 parts by mass
Cyclohexanone: 18.5 parts by mass
Finally, as curing agents, polyisocyanate (trade name: Coronate L manufactured by Tosoh Corporation): 4 parts by mass and myristic acid: 2 parts by mass are added to the coating material for forming an underlayer prepared as described above.

(Step of Preparing Coating Material for Forming Back Layer)

A coating material for forming a back layer was prepared as follows. The following starting materials were mixed in a stirring tank including a dispersion device, and filter treatment was performed to prepare the coating material for forming a back layer.

Carbon black (manufactured by ASAHI CARBON CO., LTD, trade name: #80): 100 parts by mass
Polyester polyurethane: 100 parts by mass
(Manufactured by Nippon Polyurethane Industry Co., Ltd., trade name: N-2304)
Methyl ethyl ketone: 500 parts by mass
Toluene: 400 parts by mass
Cyclohexanone: 100 parts by mass (Film Forming Step)

By using the thus prepared coating, the magnetic tape was manufactured as follows. First, the underlayer-forming coating was coated on, out of both surfaces of the reinforced film, on one surface on which the reinforced layer is not formed, followed by drying, to form an underlayer having an average thickness of 1.1 μm. Next, the recording layer-forming coating was coated on the underlayer, followed by drying, to form a recording layer having an average thickness of 0.08 μm, on the underlayer. Note that, in the process of drying the recording layer-forming coating, the magnetic powder was magnetically aligned in the thickness direction of the PEN film, by using a solenoid coil.

Next, the back layer-forming coating was coated on, out of both surfaces of the reinforced film, on the other face on which the reinforced layer is formed, followed by drying, to form a back layer having an average thickness of 0.4 μm. Then, the PEN film, having formed thereon the underlayer, the recording layer, the reinforced layer and the back layer was then subjected to hardening, followed by calendering, to smoothen the surface of the recording layer. After that, calendaring treatment was performed to smooth the surface of the recording layer. Note that an apparatus for manufacturing the magnetic tape employed here had a plurality of pairs of rollers that nip in between the magnetic tape which is caused to travel, arranged along a transport route of the magnetic recording medium.

(Step of Cutting)

The magnetic tape obtained as described above was cut into a width of ½ inch (12.65 mm). As a result, an elongated magnetic tape having the average thickness of 5.1 μm was obtained.

Comparative Example 1

A magnetic tape was obtained similarly to Example 1, except that, in the process for manufacturing the reinforced film, a Co film having an average thickness of 350 nm was formed as the reinforced layer, by evaporation on one face (first face) of the PEN film. Note that, when forming the Co film, conditions for forming the Co film were adjusted so that the Co film will have a water vapor permeability, in 100-nm-thick conversion, of 8.372 $g/m^2$·day. In addition, the reinforced film obtained in the process of manufacturing the reinforced film was found to demonstrate a depth of indentation of 1.4 μm, when measured by impressing a 0.7-mmdiameter hard sphere against the face opposite to the reinforced surface, under 5.0 gf load for 10 seconds.

Comparative Example 2

A magnetic tape was obtained similarly to Example 1, except that, in the process for manufacturing the reinforced film, a Cu film having an average thickness of 75 nm was formed as the reinforced layer, by evaporation on one face (first face) of the PEN film. Note that, when forming the Cu film, conditions for forming the Cu film were adjusted so that the Cu film will have a water vapor permeability, in 100-nm-thick conversion, of 25.900 g/m²·day. In addition, the reinforced film obtained in the process of manufacturing the reinforced film was found to demonstrate a depth of indentation of 2.5 μm, when measured by impressing a 0.7-mm-diameter hard sphere against the face opposite to the reinforced surface, under 5.0 gf load for 10 seconds.

(Measurement of Count of Defect)

Count of defects on the recording surface of the thus obtained magnetic tapes in Example 1 and Comparative Examples 1, 2 was measured as follows. Each magnetic tape was adhered on a slide glass, a 40 mm×10 mm area on the surface was observed under an optical microscope, and the count of defects on the recording surface was measured.

Table 1 summarizes configurations and results of evaluation of the magnetic tapes in Example 1 and Comparative Examples 1, 2.

TABLE 1

|  | Example 1 | Comparative Example 1 | Comparative Example 2 |
|---|---|---|---|
| Thickness of PEN film [μm] | 3.2 | 3.2 | 3.2 |
| Type of reinforced layer | Co film | Co film | Cu film |
| Method of forming reinforced layer | Sputtering | Evaporation | Evaporation |
| Thickness of reinforced layer [nm] | 270 | 350 | 75 |
| Depth of indentation [μm] | 0.25 | 1.4 | 2.5 |
| Water vapor permeability of reinforced layer in 100-nm-thick conversion [g/m² · day] | 1.057 | 8.372 | 25.900 |
| Water vapor permeability of reinforced film in 100-nm-thick conversion [g/m² · day] | 2.33 | 2.91 | 3.44 |
| Count of defect [defects/m] | 3 | 24 | 210 |

Now the "water vapor permeability of reinforced film in 100-nm-thick conversion" in Table 1 means the water vapor permeability of the reinforced film, assuming that the reinforced layer (Co film, Cu film) has a thickness of 100 nm [that is, the water vapor permeability of the film having attached thereto a reinforced layer (Co film, Cu film) of 100 nm thick].

The followings became clear from Table 1. That is, the recording surface may be suppressed from causing defects, by using the Co film as the reinforced layer, and by controlling the depth of indentation to 0.25 μm or shallower, when a 0.7-mm-diameter hard sphere was impressed against the surface, opposite to the reinforced surface, of the reinforced film under 5.0 gf load for 10 seconds.

Note now that the depth of indentation formed on the PEN film by itself, when a 0.7-mm-diameter hard sphere was impressed against one surface under 5.0 gf load for 10 seconds, was found to be 0.1 μm. It is understood from the result that the reinforced film in Example 1 could suppress the depth of indentation from increasing on the PEN film, despite provision of the reinforced layer. In contrast, the reinforced films in Comparative Examples 1, 2 were found to cause considerable increase in the depth of indentation on the PEN film, due to provision of the reinforced layer.

Although embodiments of the present disclosure and modified examples thereof have been specifically described above, the present disclosure is not limited to the above-mentioned embodiments and modified examples thereof and various modifications can be made on the basis of the technical idea of the present disclosure.

For example, the configurations, the methods, the steps, the shapes, the materials, and the numerical values cited in the above-mentioned embodiments and modified examples thereof are only illustrative, and different configurations, methods, steps, shapes, materials, numerical values, and the like may be used as necessary. Further, the chemical formulae of compounds and the like are representative, and are not limited to the described valences and the like as long as they are common names of the same compound.

Further, the configurations, the methods, the steps, the shapes, the materials, the numerical values, and the like in the above-mentioned embodiments and modified examples thereof can be combined without departing from the essence of the present disclosure.

Further, the present disclosure may also take the following configurations.

(1)

A tape-like magnetic recording medium including:

a reinforced substrate; and a recording layer arranged on the reinforced substrate, the reinforced substrate including:

a substrate that has a first face and a second face opposed to each other, and has an average thickness of 4 μm or smaller; and a metal layer that contains cobalt, arranged on the first face, the reinforced substrate by itself causing thereon a depth of indentation of 0.25 μm or shallower, when a 0.7-mm-diameter hard sphere is impressed against the second face under 5.0 gf load for 10 seconds.

(2)

The magnetic recording medium according to (1), in which the metal layer has a water vapor permeability in 100-nm-thick conversion of 8.36 g/m²·day or smaller, when measured in an environment at a temperature of 28° C. under saturation vapor pressure.

(3)

The magnetic recording medium according to (1) or (2), in which the metal layer has a water vapor permeability in 100-nm-thick conversion of 1.057 g/m²·day or smaller, when measured in an environment at a temperature of 28° C. under saturation vapor pressure.

(4)

The magnetic recording medium according to any one of (1) to (3), having an average thickness of 5.15 μm or smaller.

(5)

The magnetic recording medium according to any one of (1) to (4), in which the metal layer has an average thickness of 200 nm or larger and 400 nm or smaller.

(6)

The magnetic recording medium according to any one of (1) to (5), in which the recording layer contains a magnetic powder and a binder.

(7)

The magnetic recording medium according to (6), in which the magnetic powder contains hexagonal ferrite, ε-iron oxide or Co-containing spinel ferrite.

(8)

The magnetic recording medium according to any one of (1) to (5), in which the recording layer is a sputtered layer.

(9)

The magnetic recording medium according to any one of (1) to (8), in which the recording layer is arranged on the second face, and the magnetic recording medium further includes a back layer arranged on the metal layer.

REFERENCE SIGNS LIST

10 Magnetic recording medium
11 Reinforced substrate
11A Substrate
11B Reinforced layer
12 Underlayer
13 Recording layer
14 Back layer
21 Core part
22 Shell part
22a First shell part
22b Second shell part

The invention claimed is:

1. A tape-like magnetic recording medium comprising:
a reinforced substrate; and
a recording layer arranged on the reinforced substrate,
the reinforced substrate including:
   a substrate that has a first face and a second face opposed to each other, and has an average thickness of 4 μm or smaller; and
   a metal layer that contains cobalt, arranged on the first face, wherein an average thickness of the metal layer is larger than 200 nm,
the reinforced substrate by itself causing thereon a depth of indentation of 0.25 μm or shallower, when a 0.7-mm-diameter hard sphere of sufficient hardness to form an indentation on the reinforced substrate is impressed against the second face under 5.0 gf load for 10 seconds.

2. The magnetic recording medium according to claim 1, wherein the metal layer has a water vapor permeability in 100-nm-thick conversion of 8.36 g/m$^2$·day or smaller, when measured in an environment at a temperature of 28° C. under saturation vapor pressure.

3. The magnetic recording medium according to claim 1, wherein the metal layer has a water vapor permeability in 100-nm-thick conversion of 1.057 g/m$^2$·day or smaller, when measured in an environment at a temperature of 28° C. under saturation vapor pressure.

4. The magnetic recording medium according to claim 1, having an average thickness of 5.15 μm or smaller.

5. The magnetic recording medium according to claim 1, wherein the metal layer has an average thickness of 400 nm or smaller.

6. The magnetic recording medium according to claim 1, wherein the recording layer contains a magnetic powder and a binder.

7. The magnetic recording medium according to claim 6, wherein the magnetic powder contains hexagonal ferrite, ε-iron oxide or Co-containing spinel ferrite.

8. The magnetic recording medium according to claim 1, wherein the recording layer is a sputtered layer.

9. The magnetic recording medium according to claim 1, wherein the recording layer is arranged on the second face, and the magnetic recording medium further comprises a back layer arranged on the metal layer.

* * * * *